(12) United States Patent
Yang et al.

(10) Patent No.: US 6,781,356 B1
(45) Date of Patent: Aug. 24, 2004

(54) PWM CONTROLLER HAVING A MODULATOR FOR SAVING POWER AND REDUCING ACOUSTIC NOISE

(75) Inventors: Ta-yung Yang, Milpitas, CA (US); Chem-Lin Chen, Taipei Hsien (TW); Jenn-yu G. Lin, Taipei Hsien (TW)

(73) Assignee: System General Corp., Taipei Hsien (TW)

( * ) Notice: Subject to any disclaimer, the term of this patent is extended or adjusted under 35 U.S.C. 154(b) by 8 days.

(21) Appl. No.: 10/249,217

(22) Filed: Mar. 24, 2003

(51) Int. Cl.$^7$ ................................................ G05F 1/40
(52) U.S. Cl. ........................................ 323/282; 323/284
(58) Field of Search ............................. 323/282, 283, 323/284, 285, 286, 222, 290

(56) References Cited

U.S. PATENT DOCUMENTS

| | | | | |
|---|---|---|---|---|
| 5,336,985 A | * | 8/1994 | McKenzie | .................. 323/266 |
| 5,532,577 A | * | 7/1996 | Doluca | ....................... 323/282 |
| 5,745,352 A | * | 4/1998 | Sandri et al. | ................. 363/41 |
| 6,229,289 B1 | * | 5/2001 | Piovaccari et al. | ......... 323/268 |

* cited by examiner

Primary Examiner—Rajnikant B. Patel
(74) Attorney, Agent, or Firm—Jiang Chyun IP Office

(57) ABSTRACT

A modulator of a PWM controller is provided for saving power and reducing acoustic noise in the light load and no load conditions. The maximum on-time is kept as a constant and a bias current of the oscillator in the PWM controller is moderated to achieve the off-time modulation. The bias current is a function of the supply voltage and the feedback voltage, which is derived from a voltage feedback loop. A threshold voltage defines the level of the light load. A limit voltage defines the low level of the supply voltage. A bias current synthesizer generates the bias current. Reducing the bias current increases the off-time of the switching period. Once the feedback voltage is decreased lower than the threshold voltage, the bias current is reduced linearly and the off-time of the switching period is increased gradually. When the supply voltage is lower than the limit voltage, the bias current increases and determines a maximum off-time of the switching period. Keeping the maximum on-time as a constant and increasing the switching period by only increasing the off-time prevents magnetic components, such as inductors and transformers, from being saturated. Furthermore, a control circuit disables the oscillator as the PWM frequency may fall into the audio band, therefore the acoustic noise can be greatly reduced in the light load and no load conditions.

4 Claims, 4 Drawing Sheets

PWM CONTROLLER HAVING A MODULATOR FOR SAVING POWER AND REDUCING ACOUSTIC NOISE

BACKGROUND OF INVENTION

1. Field of the Invention

The present invention relates to a switching power supply and, more specifically, relates to the pulse width modulation (PWM) of the switching power supply.

2. Background of the Invention

The PWM controller is an integrated circuit used in the switching power supply to control and regulate the switching duty cycle. Being subject to environmental regulations, the power system design of computers and other electrical products have been required to meet the power management and energy conservation standards. The power management is to manage the system to consume power during operation and only very little power is consumed during the non-operation mode. For the power management application in the power supply, how to save the power in light load and no load condition is a main concern. One object of the PWM modulator is to optimize the saving of the power consumption and to reduce acoustic noise when the oscillation frequency falls into the audio band.

FIG. 1 shows a typical flyback power supply circuit, in which a PWM controller 100 controls and regulates the output power. The PWM-control starts when the power supply is turned on. A capacitor 220 is charged via a resistor 210 until the supply voltage $V_{CC}$ of the PWM controller 100 reaches the start-threshold. Then the PWM controller 100 starts to output PWM signal and drive the entire power supply. After starting-up, the supply voltage $V_{CC}$ is provided from the auxiliary bias winding of a transformer 400 through a rectifier 230. A resistor 240 converts the switching current information of the transformer 400 into voltage signal for PWM control and over-power protection. Once the auxiliary voltage of the transformer 400 cannot provide sufficient power for the supply voltage $V_{CC}$, the PWM controller 100 will be turned off as the supply voltage $V_{CC}$ is lower than the stop-threshold. The feedback voltage $V_{FB}$ is derived from the output of an optical-coupler 250. The input of the optical-coupler 250 is connected to the output of the power supply Vo through a resistor 290 and a zener diode 280 to form the feedback loop. Through the control of the feedback loop, the voltage $V_{FB}$ controls the on-time $T_{ON}$ duration of the PWM signal through the PWM controller 100 and dominantly decides the output power.

The power loss of the power supply is an important concern. Those major losses including the transformer core loss, the transistor switching loss, and the snubber power loss are proportional to the switching frequency F. The switching period T is the inverse of the switching frequency F, $T=1/F$. Increasing the switching period T reduces the power loss. However, to prevent from the saturation of the transformer and shrink the size of the power supply, a shorter on-time $T_{ON}$ is required. The saturation of magnetic components such as inductors and transformers may result without the limitation of the $T_{ON}$ duration and will cause over-stress damage to the switching devices such as the transistors and rectifiers. Although the power consumption of the power supply will reduce in response to the decrease of the switching frequency F, an audio noise will be created when the switching frequency falls into the audio band (such as 200 Hz 8 KHz) in light load and no load conditions. Another object is to reduce the acoustic noise when the switching frequency falls into the audio band in light load and no load conditions.

Some methods had been disclosed in prior arts to increase the regulator efficiency such as varying the switching frequency and entering the "pulse-skipping" mode according to load conditions. For instance, U.S. Pat. No. 6,100,675, "SWITCHING REGULATOR CAPABLE OF INCREASING REGULATOR EFFICIENCY UNDER LIGHT LOAD" (incorporated herein by reference) disclosed an oscillation frequency control circuit capable of varying an oscillation frequency of the oscillator circuit in response to load conditions. Another method is disclosed in U.S. Pat. No. 6,366,070 B1, "SWITCHING VOLTAGE REGULATOR WITH DUAL MODULATION CONTROL SCHEME", which disclosed the regulator employs three operation modes, which operate at constant switching frequency for heavy load condition, use dual modulation control scheme for moderate load condition, and entering "pulse-skipping" for light load condition. The disadvantage of foregoing prior arts are: (1) Varying the switching frequency without the limitation of maximum on-time may result in saturation of magnetic components and cause over-stress damage to switching devices such as transistors and rectifiers; (2) The modulation of switching frequency is only controlled by the load condition and not correlated with the supply voltage. As the switching frequency is reduced too low for saving more power in light load and no load conditions, the auxiliary bias winding of the transformer or inductor might be unable to provide sufficient power for the supply voltage of the PWM controller. The PWM control may work improperly under such condition. Thus, to correlate the frequency modulation with both load conditions and the supply voltage is needed; (3) In light load and no load conditions, the switching frequency might be decreased to the audio band. If the magnetic components are not well impregnated, the audio band switching frequency might generate an undesirable acoustic noise.

To prevent the above shortcomings of prior arts, there exists a need for a better and noiseless apparatus for improving the efficiency and saving the power consumption in light load and no load conditions.

SUMMARY OF INVENTION

The present invention provides an adaptive off-time modulation for saving power and reducing acoustic noise. The off-time modulation is achieved by moderating a bias current of an oscillator in the PWM controller. The maximum on-time of the PWM signal is kept as a constant. Reducing the bias current increases the off-time of switching period and thus the switching period is extended. The feedback voltage derived from the voltage feedback loop and the supply voltage are taken as variables to correlate with the off-time modulation. The bias current is modulated as a function of the feedback voltage and the supply voltage. A threshold voltage is a constant that defines the level of light load. A limit voltage defines the low-level of the supply voltage. A first differential signal is generated by subtracting the threshold voltage from the feedback voltage. A second differential signal is generated by subtracting the attenuated supply voltage from the limit voltage. The sum of the first differential signal and the second differential signal is converted into the bias current. The bias current is clamped by a limiter to set up the minimum switching period in normal load and full load conditions. Once the feedback voltage is decreased lower than the threshold voltage, the bias current is reduced and the off-time of the switching period is extended continuously. When the supply voltage is lower than the limit voltage, the bias current is increased and a maximum off-time of the switching period is determined.

A control circuit provides two entrance voltages. A reference resistor transfers the reference current derived from the bias current into a voltage signal to the input of the control circuit. A first entrance voltage determines a level of audio switching frequency. As the switching frequency falls into the audio band in lightload and no load conditions, the control circuit will output an OFF signal to turn off the oscillator of the PWM controller. A second entrance voltage determines a level of starting up the oscillator of the PWM controller. Once the supply voltage is decreased or the feedback voltage is increased and the input voltage of the control circuit is greater than the second entrance voltage, the oscillator will restart working again.

Advantageously, the adaptive off-time modulation improves the efficiency and saves the power consumption of the power supply in light load and no load conditions. Meanwhile, the control circuit applied in the present invention turns off the oscillator as the switching frequency falls into the audio band, which greatly reduced the acoustic noise.

It is to be understood that both the foregoing general descriptions and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
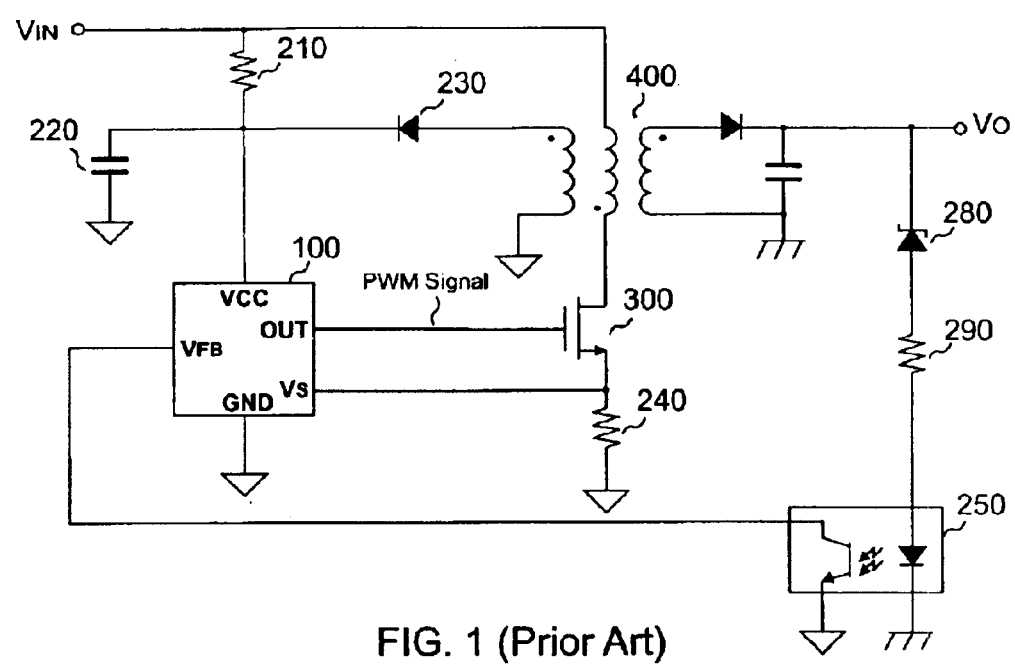
FIG. 1 shows a typical flyback circuit of a power supply.
Figure 2:
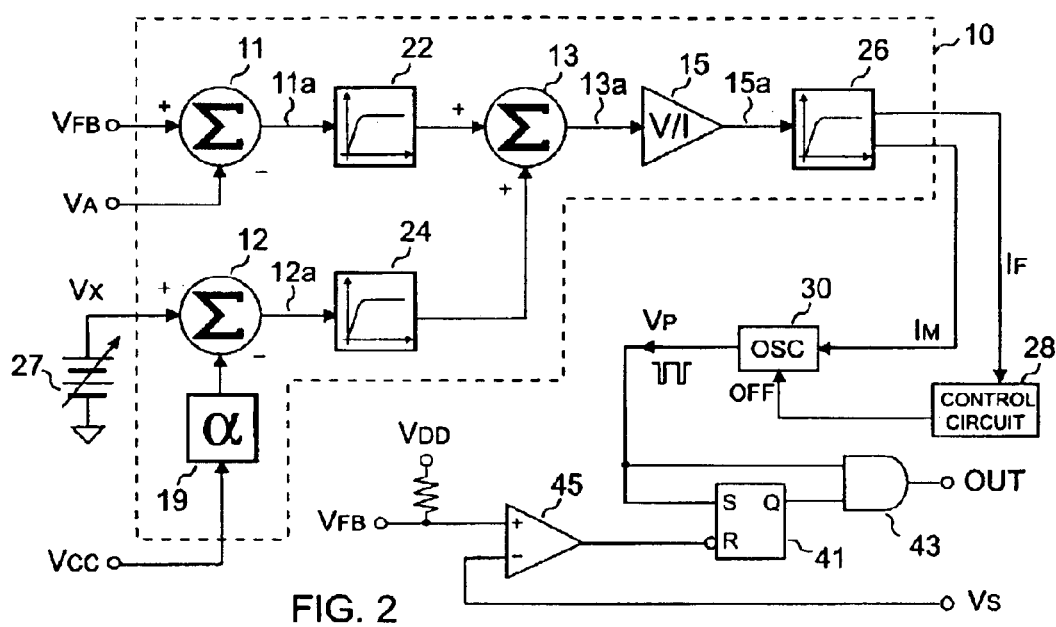
FIG. 2 illustrates a block diagram of a preferred embodiment of an adaptive off-time modulator of the present invention.

FIG. 2 shows a block diagram of an adaptive off-time modulator according to one embodiment of the present invention. A bias current synthesizer 10 generates a bias current $I_M$ for an oscillator 30 to determine an off-time of the PWM signal. A threshold voltage $V_A$ is subtracted from a feedback voltage $V_{FB}$ via an adder 11 and generates a first differential signal 11a. The output of the adder 11 is connected to the input of a limiter 22. A voltage attenuated from the supply voltage $V_{CC}$ by the attenuator $\alpha$ is subtracted from a limit voltage $V_X$ via an adder 12 and generates a second differential signal 12a. The output of the adder 12 is connected to the input of a limiter 24. The outputs of the limiter 22 and the limiter 24 are connected to two inputs of an adder 13 respectively. A V-to-I converter 15 transfers the voltage 13a derived from the output of the adder 13 into a current signal 15a. This current signal 15a is clamped by a limiter 26 to create a modulated bias current $I_M$. Reducing the bias current $I_M$ extends an oscillation period of the oscillator 30. The oscillator 30 outputs a pulse signal $V_P$ to drive a S-R register 41 and initiates a PWM cycle. The S-R register 41 is reset through a comparator 45 when the current sense input $V_S$ is higher than the feedback voltage $V_{FB}$. The logic low of the pulse signal $V_P$ represents the off-time of the oscillator 30. An AND gate 43 ensures the PWM signal output is turned off during the off-time of the oscillator 30. The bias current $I_M$ is a function of the supply voltage $V_{CC}$ and the feedback voltage $V_{FB}$.

$$S_A = (V_{FB} - V_A) \times K_A \qquad (1)$$

$$S_B = [V_X - (\alpha \cdot V_{CC})] \times K_B \qquad (2)$$

$$I_M = (S_A + S_B) \times K_C \qquad (3)$$

In the above equations, the range of the output is clamped as $(0 \leq S_A \leq N_A)$, $(0 \leq S_B \leq N_B)$ and $(0 \leq I_M \leq I_{MAX})$; $K_C$ is the transfer rate of the V-to-I converter 15.

The limiter 22 scales the first differential signal 11a by $K_A$ and clamps its output into a range of zero to a first-maximum $N_A$. The limiter 24 scales the second-differential signal 12a by $K_B$ and clamps its output into a range of zero to a second-maximum $N_B$. The limiter 26 clamps the output of the V-to-I converter 15 into a range of zero to a maximum-current $I_{MAX}$ to set up the minimum switching period in normal load and fully load conditions. Once the feedback voltage $V_{FB}$ is decreased lower than the threshold voltage $V_A$, the bias current $I_M$ is reduced according to the slope of KA and $N_A$. And the off-time of the switching period is increased continuously. When the attenuated supply voltage ($\alpha \cdot VCC$) is lower than the limit voltage $V_X$, the bias current $I_M$ is increased in accordance to the slope of $K_B$ and $N_B$, and a maximum off-time of the switching period is determined.

Figure 3:
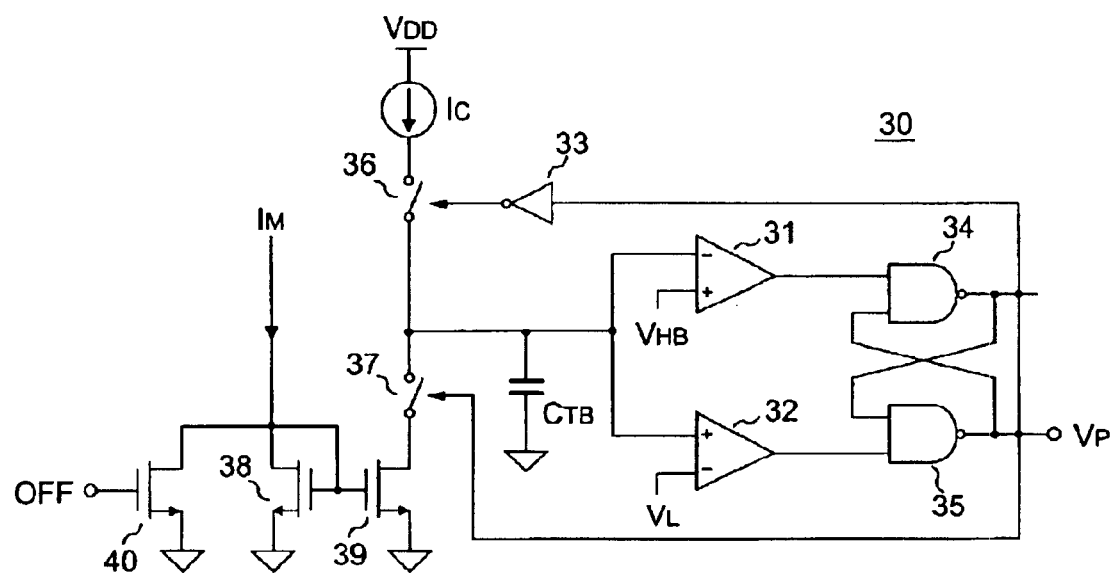
FIG. 3 displays a circuit diagram illustrating a preferred embodiment of the oscillator shown in FIG. 2 according to the present invention.

FIG. 3 illustrates one embodiment of the oscillator 30 according to the present invention shown in FIG. 2. The pulse signal $V_P$ is derived from the output of a NAND gate 35. At an initial state, the voltage applied to the capacitor $C_{TB}$ is zero. The output of a comparator 31 outputs a logic high signal to the input of a NAND gate 34. The output of a comparator 32 outputs a logic low signal to the input of the NAND gate 35. The output of the NAND gate 35 remains in logic high. The NAND gate 34 outputs a logic low signal and drives a NOT gate 33 to turn on a switch 36. The constant current source $I_C$ starts to charge the capacitor $C_{TB}$. When the voltage on $C_{TB}$ is greater than $V_{HB}$, the NAND gate 34 outputs a high signal to turn off the switch 36 and enable a switch 37 to discharge the capacitor $C_{TB}$. A MOSFET 39 mirrors a discharge current from the bias current $I_M$ flowing through a MOSFET 38. This discharge current determines the off-time of the $V_P$ pulse signal. Thus, adjusting the bias current $I_M$ can achieve the off-time modulation of the oscillator 30. The on-time of the switching period is controlled through the feedback loop to regulate the output power of the power supply.

A MOSFET 40 is used to cut off the bias current $I_M$ the oscillator 30. As the switching frequency falls into the audio band, the MOSFET 40 will be turned on and stop the bias current from flowing into the oscillator 30. The constant current source $I_C$ determines the maximum on-time of the switching period. Increasing the switching period by only increasing the off-time duration prevents the magnetic components, such as inductors and transformers, from being saturated. The maximum on-time ($T_{ON\ (max)}$) and the off-time ($T_{OFF}$) of the switching period, and the switching frequency (F) of the PWM signal are expressed as follows:

$$T_{ON(max)} = [(V_{HB} - V_L) \times C_{TB}]/I_C \quad (4)$$

$$T_{OFF} = [(V_{HB} - V_L) \times C_{TB})]/I_M \quad (5)$$

$$F = \frac{1}{T_{ON} + T_{OFF}} \quad (6)$$

Figure 4:
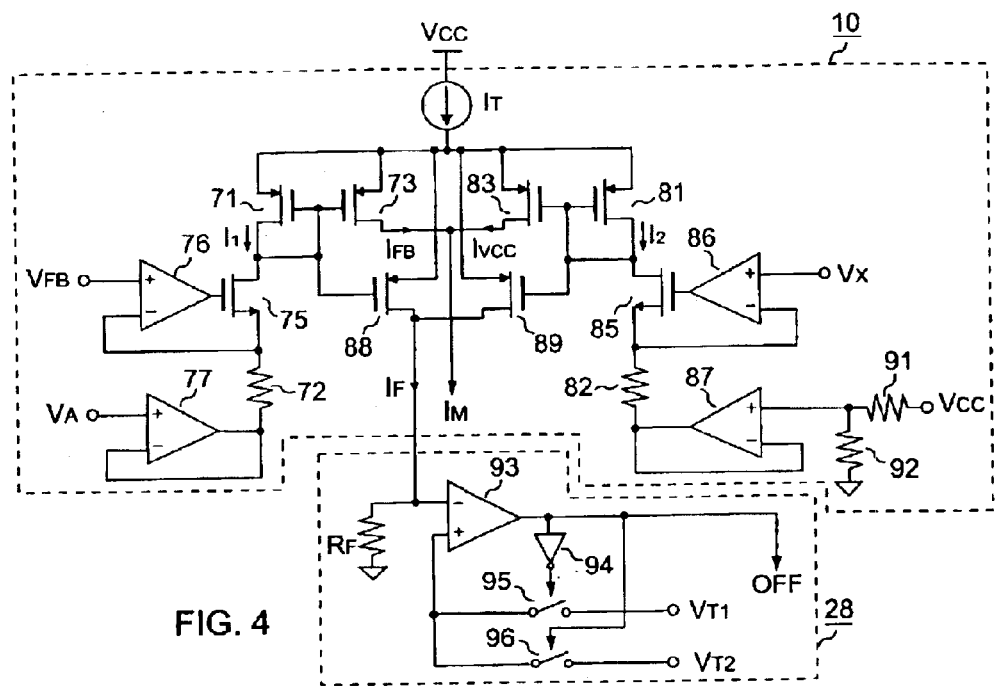
FIG. 4 shows a circuit diagram of a preferred embodiment of the bias current synthesizer shown in FIG. 2 according to the present invention.

FIG. 4 shows an embodiment of the bias current synthesizer 10 of the PWM controller which includes a constant current source $I_T$, a first current mirror composed of a MOSFET 71 and a MOSFET 73, a second current mirror composed of a MOSFET 81 and a MOSFET 83, a third current mirror composed of a MOSFET 88 and a MOSFET 89, a first buffer amplifier 77, a second buffer amplifier 87, a first operation amplifier (op amp) 76, a first V-to-I MOSFET 75, a second operation amplifier (op amp) 86, a second V-to-I MOSFET 85, a first resistor 72 (R72), a second resistor 82 (R82), an attenuator composed of a third resistor 91 (R91) and a fourth resistor 92 (R92), a first switch 95, a comparator 93, a second switch 96, a reference resistor RF and a NOT gate 94.

The feedback voltage $V_{FB}$ is connected to the positive input terminal of the first op amp 76. The threshold voltage $V_A$ is connected to the positive input terminal of the first buffer amplifier 77. The output of the first buffer amplifier 77 is connected to the negative input terminal of the first op amp 76 via the first resistor 72. The source of the first V-to-I MOSFET 75 is connected to the negative input terminal of the first op amp 76. The output of the first op amp 76 is connected to the gate of the first V-to-I MOSFET 75 for developing a first source-follow circuit to drive the first resistor 72. The drain of the first V-to-I MOSFET 75 is connected to the drain of the mirror MOSFET 71. The drain and the gate of the mirror MOSFET 71 and the gate of the mirror MOSFET 73 are connected together. The source of the mirror MOSFET 71 and the source of the mirror MOSFET 73 are connected to the constant current source $I_T$.

The limit voltage $V_X$ is connected to the positive input terminal of the second op amplifier 86. The supply voltage $V_{CC}$ is connected to the positive input terminal of the second buffer amplifier 87 via the resistor 91. The resistor 92 is connected between the positive input terminal of the second buffer amplifier 87 and the ground. The output of the second buffer amplifier 87 is connected to the negative input terminal of the second op amplifier 86 via the second resistor 82. The source of the second V-to-I MOSFET 85 is connected to the negative input terminal of the second op amp 86. The output of the second op amp 86 is connected to the gate of the second V-to-I MOSFET 85 for developing a second source-follow circuit to drive the second resistor 82. The drain of the second V-to-I MOSFET 85 is connected to the drain of the mirror MOSFET 81. The drain and the gate of the mirror MOSFET 81 and the gate of the MOSFET 83 are connected together. The source of the mirror MOSFET 81 and the source of the mirror MOSFET 83 are connected to the constant current source $I_T$.

The drain of the mirror MOSFET 73 and the mirror MOSFET 83 are connected together and output the bias current $I_M$. The threshold voltage $V_A$ is subtracted from the feedback voltage $V_{FB}$ in the first op amplifier 76 to generate a first output, which is input to the gate of the first V-to-I MOSFET 75 and converted to a first current $I_1$. The first current mirror mirrors the first current $I_1$ and outputs a current $I_{FB}$ through the drain of the mirror MOSFET 73. The limit voltage $V_X$ is subtracted from the supply voltage $V_{CC}$ attenuated by the attenuator to generate a second output, which is connected to the gate of the second V-to-I MOSFET 85 and converted to a second current $I_2$. The second current mirror mirrors the second current $I_2$ and outputs a current $I_{VCC}$ through the drain of the mirror MOSFET 83. The current $I_{FB}$ is applied to the current $I_{VCC}$ to form the bias current $I_M$. When the feedback voltage $V_{FB}$ is low and the supply voltage $V_{CC}$ is high, the bias current $I_M$ reduces linearly and extends the off-time of the oscillation period of the oscillator 30 shown in FIG. 2. On the contrary, when the feedback voltage $V_{FB}$ is high and/or the supply voltage $V_{CC}$ is low, the $I_M$ increases gradually.

$$I_{FB} = [(V_{FB} - V_A)/R_{72}] \times M_A \quad (7)$$

$$I_{VCC} = [(V_X - \alpha \cdot V_{CC})/R_{82}] \times M_B \quad (8)$$

$$I_M = I_{FB} + I_{VCC} \quad (9)$$

In the above equations, the range of the $I_M$ is clamped as $(0 \leq I_M \leq I_T)$; $M_A$ is the transfer ratio of the first current mirror; $M_B$ is the transfer rate of the second current mirror; $\alpha$ is equal to $[R92/(R91+R92)]$. The minimum off-time of the PWM signal is determined by the constant current source $I_T$ as shown in equation (5) and (7)–(9).

A third current mirror is composed of a mirror MOSFET 88 and a mirror MOSFET 89. The gate of the mirror MOSFET 88 is connected to the gate of the mirror MOSFET 71. The gate of the mirror MOSFET 89 is connected to the gate of the mirror MOSFET 81. The source of the mirror MOSFET 88 and the source of the mirror MOSFET 89 are connected to the constant current source $I_T$. The drain of the mirror MOSFET 88 and the drain of the mirror MOSFET 89 are connected together to output a reference current $I_F$ in proportion to the variation of the bias current $I_M$.

A control circuit 28 shown in FIG. 4 includes a comparator 93, a first switch 95, a second switch 96, a reference resistor $R_F$ and a NOT gate 94. The reference resistor $R_F$ is connected to the negative input terminal of the comparator 93. The output of the comparator 93 is connected to the control terminal of the second switch 96 and the input terminal of the NOT gate 94. The output terminal of the NOT gate 94 is connected to the control terminal of the first switch 95. A first entrance voltage $V_{T1}$ is connected to the input terminal of the first switch 95. A second entrance voltage VT2 is connected to the input terminal of the second switch 96. The outputs of the first switch 95 and the second switch 96 are connected together to the positive input terminal of the comparator 93. In normal load condition, the output of the comparator 93 is a logic low voltage. The NOT gate 94 inverts this logic low voltage and generates a logic high voltage to turn on the first switch 95 that makes the connection of the first entrance voltage $V_{T1}$ to the positive input terminal of the comparator 93. The first entrance voltage $V_{T1}$ defines the threshold that the switching frequency falls into the audio band. Once the switching frequency reduces and falls into the audio band due to the light load and no load conditions, the reference current $I_F$ will reduces in proportion to the decrease of the bias current $I_M$. The reference resistor $R_F$ converts the reference current $I_F$ into a reference voltage $V_F$ in the negative input terminal of the comparator 93. Once the voltage $V_F$ is lower than the first entrance voltage $V_{T1}$, the comparator will output a logic high OFF signal, which turns off the first switch 95 and turns on the second switch 96. This OFF signal is connected to the gate of a MOSFET 40 shown in FIG. 3. The source of the MOSFET 40 is connected to the ground. The drain of the MOSFET 40 is connected to the drain of the mirror MOSFET 38. The logic high OFF signal turns on the MOSFET

40 and cuts off the bias current of the oscillator. The oscillation of the oscillator 30 shown in FIG. 2 will stop without the bias current $I_M$. When the feedback voltage $V_{FB}$ increases or the supply voltage $V_{CC}$ decreases due to the increase of the load condition, the reference current $I_F$ will increase in proportion to the bias current $I_M$. The second entrance voltage VT2 defines the threshold to restart the oscillation of the oscillator 30. Once the reference voltage $V_F$ is higher than the second entrance voltage $V_{T2}$, the comparator 93 will output a logic low voltage to turn off the MOSFET 40 and the second switch 96. The NOT gate 94 inverts the low logic voltage to turn on the first switch 95 and make the connection of the first entrance voltage $V_{T1}$ to the positive input terminal of the comparator 93 again. The logic low OFF signal makes the bias current $I_M$ flow into the oscillator 30 again. Thus, the oscillator 30 will restart the oscillation according to the variation of the load conditions.

As describe above, the PWM controller including an adaptive off-time modulation of the present invention can reduce the power consumption for the power supply in light load and no load conditions. Furthermore, the acoustic noise will be greatly reduced when the PWM frequency falls into the audio band in light load and noload conditions by the control of the control circuit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pulse width modulation(PWM) controller having a modulator for saving power and reducing acoustic noise comprising:

a bias current synthesizer having four input terminals and two output terminals, wherein, a first output terminal of the bias current synthesizer generates a bias current that determines an off-time of a PWM switching period and a second output terminal of the bias current synthesizer outputs a reference current;

an oscillator having two input terminals, wherein a first input terminal of the oscillator is connected to the first output terminal of the bias current synthesizer for generating a pulse-signal for PWM switching, an on-time of the pulse-signal is a constant and an off-time of the pulse-signal is increased as the bias current decreases, a second input terminal of the oscillator is used to turn on/off the oscillator;

a control circuit having an input terminal and an output terminal, wherein the input terminal of the control circuit is connected to the reference current, which is derived from the second output terminal of the bias current synthesizer, the output terminal of the control circuit is connected to the second input terminal of the oscillator;

a RS flip-flop for generating an on-off signal, wherein the RS flip-flop is set by the pulse-signal and reset by a feedback control;

an AND-gate having two input terminals for outputting a PWM signal, wherein a first input terminal of the AND-gate is connected to the pulse-signal and a second input terminal of the AND-gate is connected to the on-off signal;

a feedback voltage connected to a first input of the bias current synthesizer, wherein the feedback voltage is derived from the voltage feedback loop of the power supply for controlling the on-time of the PWM signal and regulating the output of the power supply;

a threshold voltage connected to a second input of the bias current synthesizer to determine the level of a light load condition;

a limit voltage connected to a third input of the bias current synthesizer to determine the level of a low supply voltage; wherein the limit voltage is changed in every PWM switching cycle which affects the bias current to produce a variable PWM switching frequency when the PWM switching frequency is decreased in the light load and no load condition; and a supply voltage connected to a fourth input of the bias current synthesizer, in which the supply voltage is the power supply voltage of the PWM controller;

wherein the bias current is a function of the feedback voltage, the threshold voltage, the supply voltage, and the limit voltage, such that when the feedback voltage is lower than the threshold voltage, the bias current starts to reduce in response to the decrease of the feedback voltage, and if the supply voltage is lower than the limit voltage, the bias current starts to increase in response to the decrease of the supply voltage.

2. The PWM controller as claimed in claim 1, wherein the bias current synthesizer comprising:

a first adder, operative to subtract the threshold voltage from the feedback voltage;

an attenuator for attenuating the supply voltage;

a second adder, operative to subtract the output of the attenuator from the limit voltage;

a first limiter for scaling and clamping the output of the first adder to a first differential signal, wherein the amplitude of the first differential signal is in the range of zero to a first-maximum, wherein the first-maximum determines the slope of the change of the bias current in response to the variation of the feedback voltage;

a second limiter for scaling and clamping the output of the second adder to a second differential signal, in which the amplitude of the second differential signal is in the range of zero to a second-maximum, where the second-maximum determines the slope of the change of the bias current in response to the variation of the supply voltage;

a third adder, whereby the first differential signal is added with the second differential signal;

a V-to-I converter for converting the output of the third adder to a V-to-I current; and a third limiter for clamping the V-to-I current to generate the reference current and the bias current, in which the amplitude of the bias current is in the range of zero to a current-maximum, wherein the current-maximum determines the minimum off-time of the PWM switching period.

3. The PWM controller as claimed in claim 1, wherein the bias current synthesizer comprising:

a first operation amplifier having a positive input terminal, a negative input terminal and an output terminal, in which the positive input is connected to the feedback voltage;

a first buffer amplifier having a positive input terminal, a negative input terminal and an output terminal, in which the negative input terminal is connected to the output and the positive input terminal is connected to the threshold voltage;

a first V-to-I transistor having a gate, a source and a drain, in which the gate is driven by the output terminal of the first operation amplifier, and the source is connected to the negative input terminal of the first operation amplifier developing a first source follow circuit;

a first resistor connected between the output of the first buffer amplifier and the source of the first V-to-I transistor; wherein the threshold voltage is subtracted from the feedback voltage via the first resistor generating a first-current;

an attenuator;

a second operation amplifier having a positive input terminal, a negative input terminal and an output terminal, in which the positive input terminal is connected to the limit voltage;

a second buffer amplifier having a positive input terminal, a negative input terminal and an output terminal, in which the negative input terminal is connected to the output terminal and the positive input terminal is connected to the supply voltage through the attenuator;

a second V-to-I transistor having a gate, a source and a drain, in which the gate is driven by the output of the second operation amplifier, and the source is connected to the negative input of the second operation amplifier developing a second source follow circuit;

a second resistor connected between the output terminal of the second buffer amplifier and the source of the second V-to-I transistor; wherein the supply voltage attenuated by the attenuator is subtracted by the limit voltage via the second resistor generating a second current;

a first-input transistor having a gate, a source and a drain;

a first-output transistor having a gate, a source and a drain, in which the source of the first-input transistor and the source of the first-output transistor are connected together, wherein the drain of the first V-to-I transistor, the drain of the first-input transistor, the gate of the first-input transistor and the gate of the first-output transistor are connected together to form a first mirror amplifier; wherein the first current drives the first mirror amplifier to generate a mirroredFB-current;

a second-input transistor having a gate, a source and a drain;

a second-output transistor having a gate, a source and a drain, in which the source of the second-input transistor and the source of the second-output transistor are connected together; wherein the drain of the second V-to-I transistor, the drain of the second-input transistor, the gate of the second-input transistor and the gate of the second-output transistor are connected together to form a second mirror amplifier, wherein the second current drives the second mirror amplifier to generate a mirroredVCC-current;

a third output transistor having a gate, a source and a drain, in which the gate of the third output transistor is connected to the gate of the first input transistor, the source of the third output transistor is connected to the source of the first input transistor;

a fourth output transistor having a gate, a source and a drain, in which the gate of the fourth output transistor is connected to the gate of the second input transistor, the source of the fourth output transistor is connected to the source of the second input transistor, the drain of the fourth transistor and the drain of the third transistor are connected together to generate the reference current; and a limit current-source connected to the source of the first-input transistor, the source of the first-output transistor, the source of the second-input transistor, the source of the second-output transistor, the source of the third output transistor and the source of the fourth output transistor for clamping the maximum output current of the bias current; wherein the drain of the first-output transistor and the drain of the second-output transistor are connected together to sum the mirroredFB-current and the mirroredVCC-current and generate the bias current.

4. The PWM controller as claimed in claim 1, wherein the control circuit comprising:

a first switch having an input terminal, an output terminal and a control terminal;

a second switch having an input terminal, an output terminal and a control terminal;

a reference resistor for converting the reference current into a reference voltage;

a NOT gate having an output terminal connected to the control terminal of the first switch and an input terminal;

a comparator having a negative input terminal, a positive input terminal, and an output terminal, in which the negative input terminal is connected to the reference resistor; the positive input terminal is connected to the output terminals of the first switch and the second switch; the output terminal, which is connected to the input terminal of the NOT gate and the control terminal of the second switch, is applied to enable and disable the oscillation of the oscillator.

* * * * *